United States Patent [19]
Gasparini et al.

[11] Patent Number: 5,798,615
[45] Date of Patent: Aug. 25, 1998

[54] UNIVERSAL HIGH INTENSITY DISCHARGE ELECTRONIC STARTER

[75] Inventors: Ricardo Gasparini; Alejandro Cavolina, both of Miami, Fla.

[73] Assignee: Unitrend Power Technology, Corp., Miami, Fla.

[21] Appl. No.: 697,869

[22] Filed: Aug. 30, 1996

[51] Int. Cl.⁶ .................................................. H05B 37/02
[52] U.S. Cl. ........................ 315/219; 315/244; 315/DIG. 7
[58] Field of Search ........................... 315/248, DIG. 7, 315/244, 219, 209 R

[56] References Cited

U.S. PATENT DOCUMENTS

| | | | |
|---|---|---|---|
| 4,723,098 | 2/1988 | Grubbs | 315/244 |
| 5,051,662 | 9/1991 | Counts | 315/247 |
| 5,057,752 | 10/1991 | Grabner et al. | 315/244 |
| 5,412,287 | 5/1995 | Shackle | 315/247 |
| 5,416,388 | 5/1995 | Shackle | 315/247 |

Primary Examiner—Robert Pascal
Assistant Examiner—Michael Shingleton
Attorney, Agent, or Firm—J. Sanchelima

[57] ABSTRACT

An electronic starter for high intensity discharge devices, such as mercury vapor, high pressure sodium, and metal halide lamps. The present invention includes voltage controlled oscillator with a resonant frequency that is determined by the direct voltage applied and by a resonance circuit that includes the high intensity device as part of the resonance circuit. A higher frequency of oscillation is present upon start-up before the device is ionized of approximately 300 kilohertz. After that, the high intensity device shunts out one of the capacitance reactive elements lowering the circuit's Q and maintaining an operating frequency that oscillates between 20 and 100 kilohertz. The inductive element acts as a current limiting device and a protection circuit is provided to monitor the voltage across the lamp and to disable the oscillator if abnormal conditions are detected including removal of the lamp.

8 Claims, 3 Drawing Sheets

UNIVERSAL HIGH INTENSITY DISCHARGE ELECTRONIC STARTER

BACKGROUND OF THE INVENTION

1. Field of the Invention

The present invention relates to an electronic starter for high intensity discharge lamps and all devices with similar characteristics.

2. Description of the Related Art

Several devices have been designed in the past to start and operate high pressure sodium lamps and other high intensity discharge devices. However, most of them used the 50/60 hertz public electrical power network that requires relatively large and heavy ballasts or inductors. Also, many of them involve switching relatively high current that contribute to deterioration of the lamp assemblies and associated circuitry, shortening its life, also generate unwanted harmonics that may interfere with other electronic apparatuses. One of these devices is described in U.S. Pat. No. 3,889,152 issued to Bodine, Jr. and Rosiak, in 1975, entitled "Starting and Operating Ballast For High Pressure Sodium Lamps". This device involves triggering a control rectifier when the voltage of a capacitor reaches a predetermined level. This approach has the drawbacks mentioned above.

The closest reference known to Applicant corresponds to application notes AN-973 published by International Rectifier, 233 Kansas Street, El Segundo, Calif. 90245, wherein an application for this manufacturer's MOSFET transistors (under the HEXFET brand) is explained as it applies to fluorescent and high intensity discharge lamps.

Another reference corresponds to U.S. Pat. No. 5,130,611 issued to Johns, in 1992, entitled "Universal Electronic Ballast System". As with the previous reference, this invention uses a switching device that at high current intensities produces the adverse results mentioned above.

None of these references or other devices in the prior art utilize a device that ionizes the vapor in the high intensity discharge device load with a high frequency electrical field in the 300 kilohertz range, and after ionization the frequency is reduced by the contribution in the device's impedance to the overall resonance circuit and maintaining an operating frequency between 20 and 100 kilohertz. By not keeping the operating frequency stable, as taught by the above mentioned manufacturer and others, undesired harmonics and distortion is minimized.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide an electronic starter device that can be used with all high intensity discharge devices, including lamps of this type, that minimizes the start-up time required.

It is another object of this invention to provide a device that saves electrical energy, while maintaining the same luminous intensity, in high intensity lamp devices.

It is still another object of the present invention to provide a device that includes an oscillator to deliver the start-up electrical energy at frequency 300 kilohertz and variable operating frequencies going between 20 and 100 KHz at the AC input line frequency (50-60 Hz).

It is yet another object of this invention to provide a device that keeps undesirable harmonics and distortions to a minimum.

It is another object of this invention to provide an electronic starter device for high intensity discharges devices that is volumetrically efficient and of relatively light weight.

Another object of this invention is to provide an electronic starter device that generates a minimum of pulses and other undesirable harmonics.

It is yet another object of this invention to provide an electronic starter device that maximizes the power factor, approaching 1.0, and thus obviating the need for compensating capacitors, as it is typically required when using conventional ballasts.

Another object of this invention is to provide an electronic starter device that generates a minimum of heat notwithstanding the high frequencies at which it operates.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
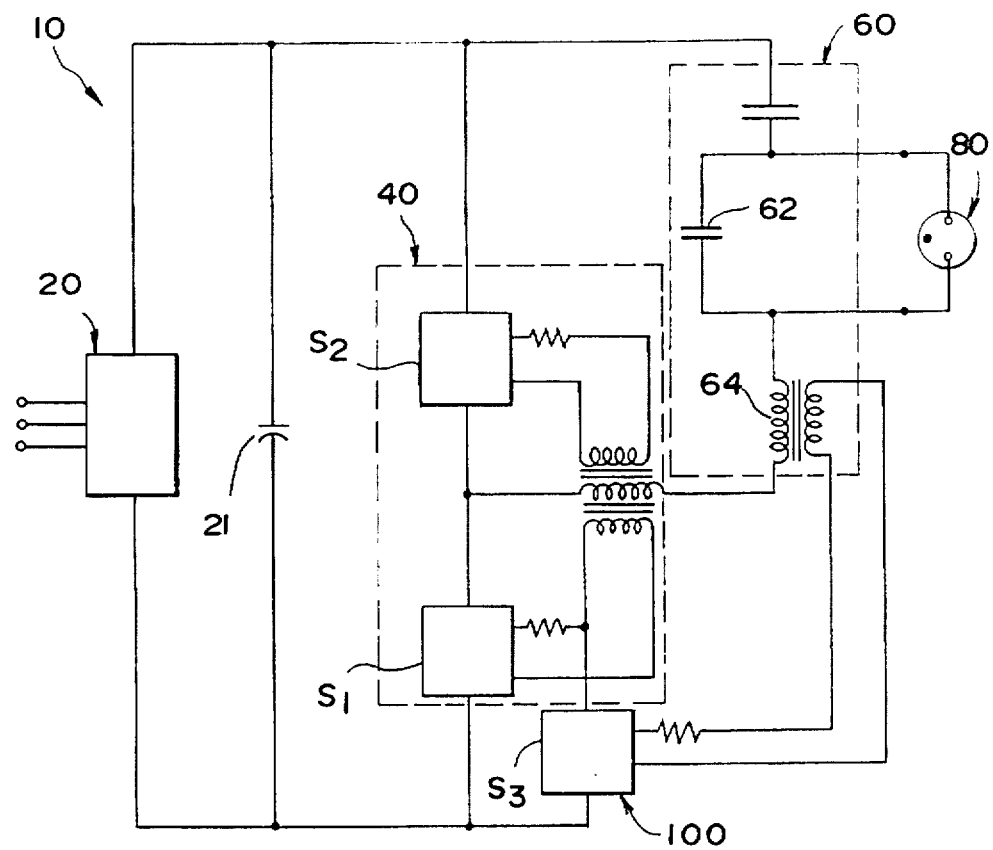
FIG. 1 represents a simplified block diagram for the invention.

Referring now to FIG. 1, where the present invention is generally referred to with numeral 10, it can be observed that it basically includes a rectifier circuitry 20, oscillator circuitry 40, resonant ballast circuit 60, and high intensity discharge load 80. For the purposes of this application, we will be referring specifically to high intensity discharge lamps for load 80 but there are other high intensity devices, in addition to lamps, where the benefits of the present invention can be utilized. Circuit protection circuitry 100 disables oscillator circuitry 60 when load 80 is removed, or other abnormal conditions exist.

FIG. 1 is a general block diagram and it shows a simplified version of the present invention. A variable rectified D.C. source of 300 V.D.C. is obtained from the public network 220 V.A.C. The variable D.C. voltage is applied to oscillator circuitry 40 for which its resonance frequency is a function of the variable D.C. voltage applied and defining the ratings of the component of resonance circuitry 60. To achieve this variable D.C. voltage the capacitance of capacitor 21 is selected to be. in the preferred embodiment, in the 7 microfarad range which is extremely small. In the above referenced application notes, the capacitance selected was a 100 microfarad, in other words, more than one order of magnitude higher. The notes follow the conventional norm of providing a stable D.C. output which is contrary to what is pursued with the present invention. Lamp load 80 is connected in parallel with capacitor 62 to apply the required ionization voltage and inductor 64 acts as a current limiter.

By providing a variable D.C. voltage to resonant ballast circuit 60, the oscillating frequency is also varied according over a predetermined range. One simple way of creating a variable D.C. voltage source is, as described above, selecting an excessively small filtering capacitor. In the preferred embodiment, the oscillation determining components and the variable voltage were selected to provide an oscillating frequency that goes from 20 KHz to 100 KHz in 0.00833 seconds (½×60) for 60 Hz A.C. networks.

Figure 4:
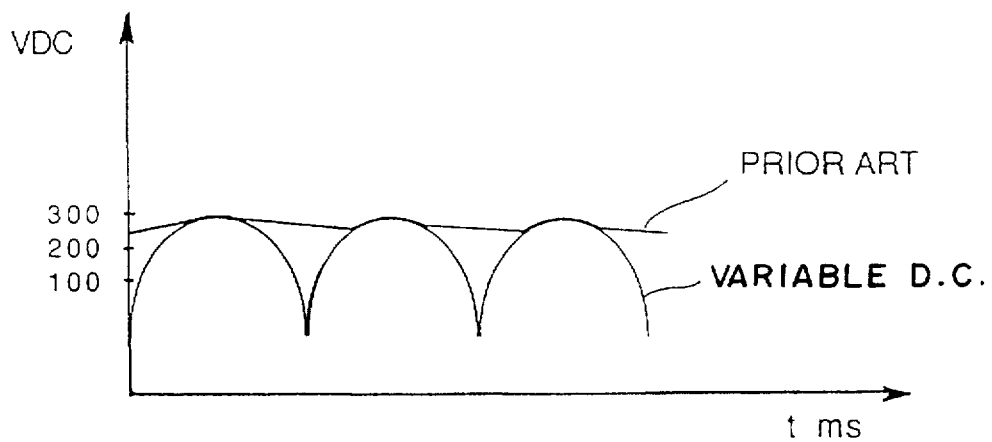
FIG. 4 is a graph showing the voltage (direct) against time provided by the prior art and the present invention to the ballast circuit.
Figure 5:
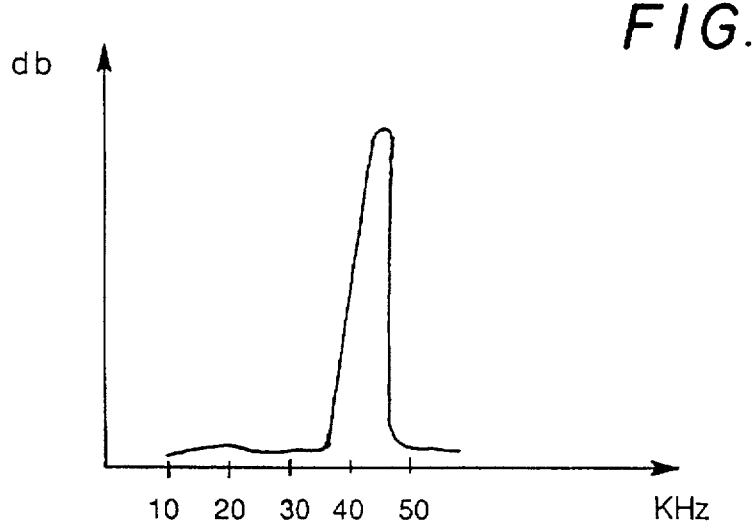
FIG. 5 shows the concentration of the harmonics in the prior art resonant ballast.
Figure 5A:
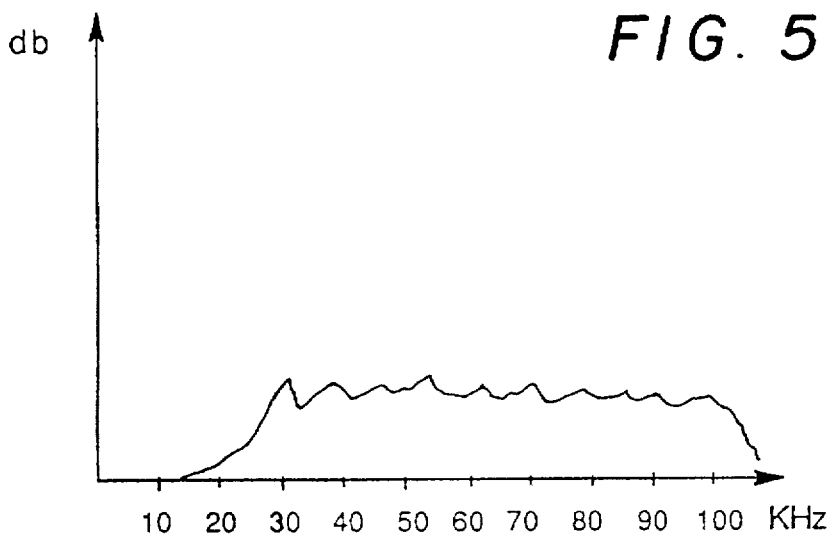
FIG. 5A shows the harmonics being distributed over a large band.

As shown in FIGS. 4 and 4A, the conventional resonant ballast circuit, such as the one described in the International Rectifier notes, presents a reactive load to the A.C. input with a relatively low power factor and the harmonic concentrates in the 40 KHz area. With the present invention, the oscillating frequency is varied and the undesirable harmonics distributed over a larger band with considerable smaller intensity. The latter being more manageable and easier to eradicate or filter out.

FIG. 1 shows in simplified form the operation of the invention after start-up. The start-up circuitry is explained below. Basically, an oscillating current is passed through resonant ballast circuitry 60 using the impedance of inductor 64 to limit the intensity of the current to prevent a runaway situation. Switching circuits $S_1$ and $S_2$ cause the periodic charging of capacitors 62 and 63. If there is no lamp load 80 connected, this periodic operation takes place at the resonance frequency which, in the preferred embodiment, is in the neighborhood of 300 KHz. With lamp load 80 in parallel (after ionization) with capacitor 62, the resonance frequency is lowered after start-up ionization is achieved (prior to that point lamp load 80 behaves substantially as an open circuit) to somewhere between 20 KHz and 100 HKz in the preferred embodiment depending on the voltage applied by rectifier assembly 20. When the frequency is lowered the reactive impedance across 62 increases. For maximum efficiency, the capacitive impedance of capacitor 62 at the operating frequencies should approximate the operating impedance of the load.

Protection circuitry 100 includes switching circuit $S_3$ that shorts out the gate to switching circuit $S_1$, disabling it, when voltage induced in the secondary of inductor 64 exceeds a predetermined magnitude. Otherwise, if oscillator circuit 40 is allowed to run indefinitely at the resonance frequency (when lamp load 80 is broken or removed) the circuit would burn. This protection circuitry 100 is described in the IR notes referenced above.

Figure 3:
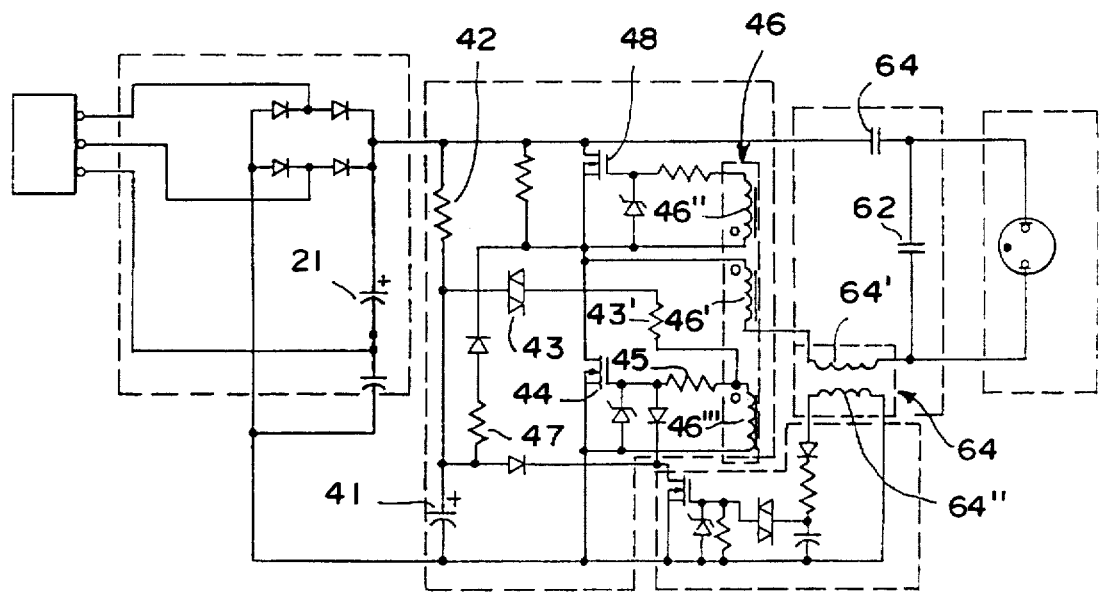
FIG. 3 provides a schematic diagram of one of the preferred embodiments of the present invention.
Figure 2A:
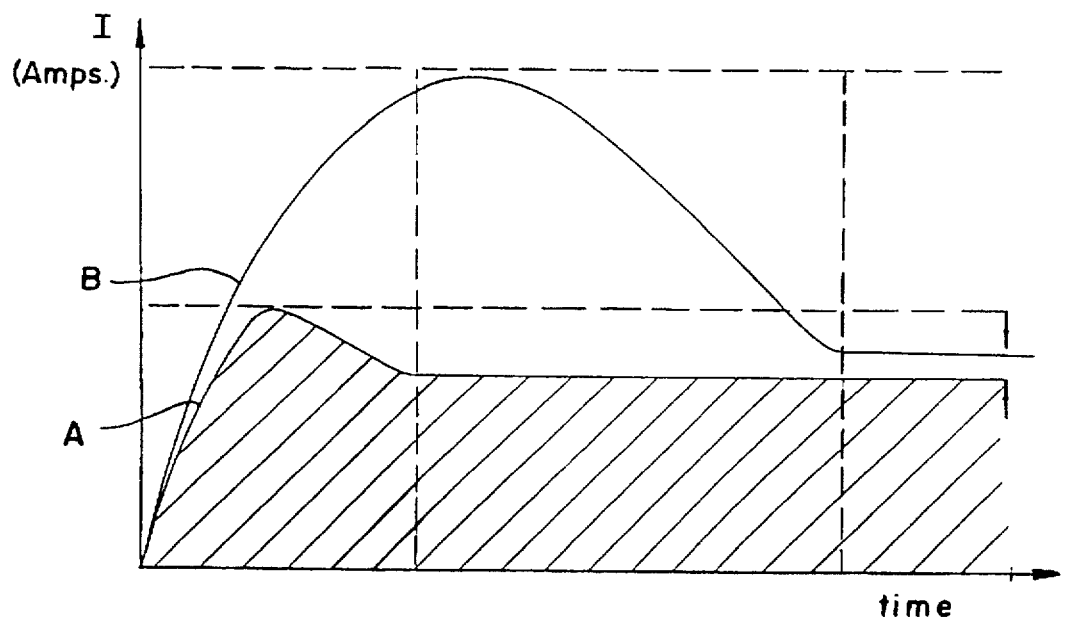
FIG. 2A illustrates a chart providing a graphical representation of the current intensity behavior over time of a high intensity discharge lamp over time using a conventional ballast B and with the present invention A.
Figure 2B:
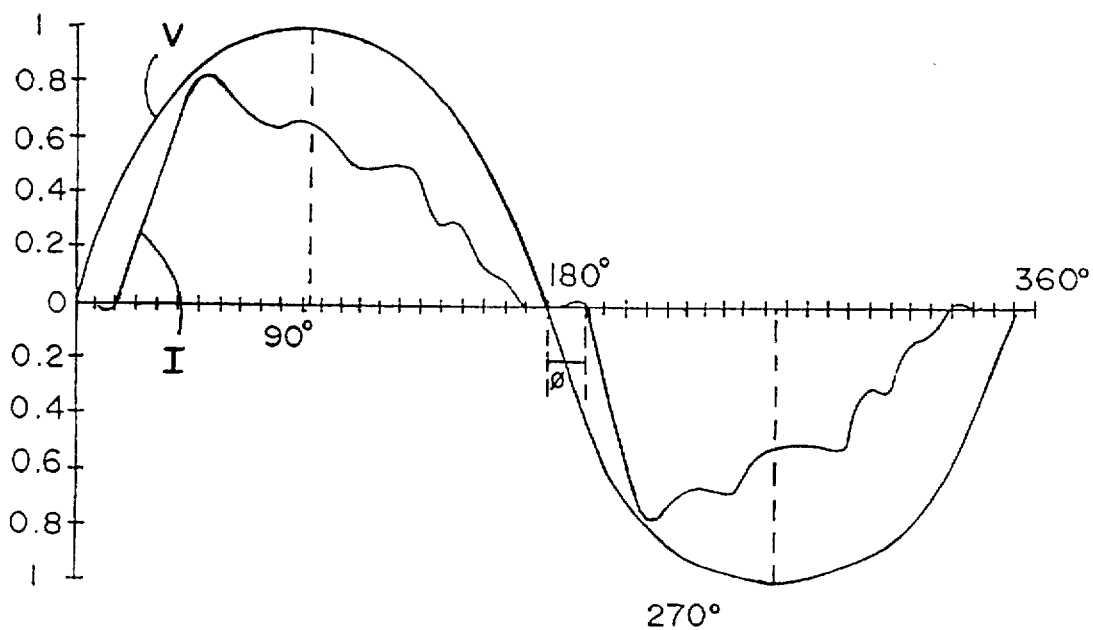
FIG. 2B shows the wave forms of the public network input voltage V and current I substantially in phase when the present invention is used.

The operation of the invention, in accordance with the schematic shown in FIG. 3, is as follows. First, when the A.C. source is applied, it is rectified and allowed to undulate as described above. Capacitor 41 is charged through resistor 42. The ratings for these components in the preferred embodiment, are 10 microfarad and 2 megohms, respectively. Capacitor 41 charges to about 32 volts in approximately 2 seconds. DIAC 43 is rated at 32 volts and it is connected through a limiting resistor 43' (not disclosed in the application notes) to the gate of transistor 44 through resistor 45 which is a 100 ohms resistance. Transistor 44 is implemented with a MOSFET transistor, part No. IRF 740, or equivalent devices manufactured by Harris and Motorola. When the voltage across capacitor 41 exceeds 32 volts, then transistor 44 (also IRF 740 MOSFET transistor) is turned on closing the circuit for resonance circuitry 60 through primary 46' of transformer 46. Simultaneously, capacitor 41 is discharged through resistor 47, rated at 1 kilohm, or about 20 times faster than the speed at which it was charged.

Inductor 64 is designed with the total capacitance of capacitors 62 and 63 in series, to be in resonance at about 300 Mhz which is a transitory starting frequency. The implementation of inductor 64, in the preferred embodiment, includes a primary 64' having 35 turns with No. 12 wire and a secondary coil 64" having three turns No. 30 wire. Capacitor 62 is a 0.033 microfarad capacitor and the capacitance for capacitor 63 is 1.5 microfarad, which is considerable larger. Since the reactance of capacitor 62 is considerably larger than the reactance of capacitor 63, most of the voltage across these two capacitors will appear between the terminals of capacitor 62 which in turn is connected in parallel with lamp load 80. However, once lamp load 80 starts conducting, the voltage across capacitor 62 drops to the nominal voltage of lamp load 80 and the resonance and oscillatory frequency for oscillator circuit 40 is lowered to between 20 Khertz (dictated by the effective series combination resonance of capacitor 63 and inductor 64 and to a lesser extent capacitor 62 which is basically switched out) and 100 Kilohertz. At these lower operating frequencies "Q", inductor 64 restricts the current through ionized lamp load 80. These lower frequencies are the operating frequencies and may be varied between 20 KHz and 100 KHz, approximately, thus distributing the resulting harmonics.

Coil 46' of transformer 46 has three turns with No. 22 wire and conducts current in one direction when transistor 44 is on and capacitors 62 and 63 are charging. After reaching full charge, the current ceases, and the magnetic energy stored in transformer 46 induces a voltage in coil 46" (19 turns, wire No. 30) of inverse polarity that causes MOSFET transistor 48 (similar to transistor 44) to conduct providing a path to discharge capacitors 62 and 63 through primary coil 46', since transistor 44 is now off. Once ionized, the frequency is dropped automatically since capacitor 62 is practically shunted out and from that point the reactance of inductor 64 is what practically limits the current through lamp load 80.

In this manner, lamp load 80 is provided the necessary energy at a high frequency without requiring the use of a heavy ballast. Even the above referenced application notes (FIG. 11, page 6) show that two "E" cores are required to implement the transformer, whereas in the present invention one core "E" and one core "I" will suffice. This reduces the weight of the components which highly desirable specially for those used in public lighting.

As mentioned above, protective circuitry 100 monitors the voltage across the primary coil 64' of inductor 64, as seen in FIG. 3. The voltage induced in secondary coil 64" is rectified with diode 101 and used to charge capacitor 102. A voltage of about 20 volts is present across capacitor 102 under normal operation. However, if this voltage exceeds a predetermined voltage, for which the rating of DIAC 103 is selected (32 volts in the preferred embodiment), then transistor 104 (similar to transistor 44) is turned on, pulling down the gate of transistor 44 and thus disabling any more oscillation. An extended rise in voltage could appear when lamp load 80 is removed or does not work according to its specifications.

One of the advantages of operating at higher frequencies (than the public networks 50–60 Hz) is that the size and weight of the inductive components is reduced.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic starter for a high intensity discharge load, comprising:
   A) electricity source means for delivering a periodically variable direct voltage;
   B) voltage controlled oscillator means selectively connected to said electricity source means and adapted to provide a start-up oscillating signal of approximately 300 kilohertz upon connection to said electricity source means;
   C) means for providing a resonance frequency to said oscillator means including an inductance reactive element in series with first and second capacitive reactive members, also in series, and said load being connected in parallel with said second capacitive reactive member so that the operating resonant frequency of said combination is decreased when said load is ionized, wherein said operating resonance frequency periodically varies between 20 kilohertz and 100 kilohertz;
   D) sensing means for monitoring the voltage across said inductance reactive element; and
   E) means for disabling said oscillator means connected to said sensing means so that said oscillator means is disabled when a predetermined voltage is sensed.

2. The electronic starter set forth in claim 1 wherein said electric source means for delivering direct voltage includes a full bridge rectifier having an output.

3. The electronic starter set forth in claim 2 wherein said electronic source means for delivering a variable direct voltage includes a capacitive element at said output so that an undulated voltage wave form is delivered.

4. The electronic starter set forth in claim 3 wherein the capacitance of said first capacitive reactive member is at least ten times greater than the capacitance of said second capacitive reactive member.

5. The electronic starter set forth in claim 4 wherein said second capacitive reactive member has a capacitive range between 0.01 and 0.05 microfarad.

6. The electronic starter set forth in claim 5 wherein said means for disabling said oscillator means includes a secondary inductor coil coupled to said inductance reactive element so that a voltage induced in said secondary inductor coil is proportional to the current through said inductance reactive element.

7. The electronic starter set forth in claim 6 wherein said oscillator means includes transistor switching circuitry.

8. The electronic starter set forth in claim 7 wherein said oscillator means includes an RC circuit to initiate the oscillation of said oscillator means at a predetermined frequency.

* * * * *